ent Nov. 11, 1952

2,617,824

UNITED STATES PATENT OFFICE 2,617,824

SULFATES OF AMINOBENZOIC DIETHYL-AMINOETHYL-AMIDE

Marjorie B. Moore and Charles A. Stainbrook, Waukegan, Ill., assignors to Abbott Laboratories, North Chicago, Ill., a corporation of Illinois No Drawing. Application December 11, 1950, Serial No. 200,304

3 Claims. (Cl. 260—558)

The present invention relates to new chemical compounds which are useful for therapeutic purposes.

We have discovered that the two sulfate salts (i. e. the neutral sulfate and the acid sulfate) of the compound, p-amino-N-(2-diethylaminoethyl)-benzamide, of the formula:

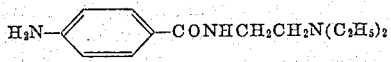

have unique physical properties not found in salts of the same base with other acids. The present invention is the result of a research investigation to prepare a suitable pharmaceutical salt of the novel base, p-amino-N-(2-diethylaminoethyl)-benzamide. As a part of this investigation we attempted to prepare a salt which would have the properties required for use in pharmaceutical dispensing forms such as injectable solutions, tablets and capsules, etc. In the course of our research, we prepared such salts of p-amino-N-(2-diethylaminoethyl)-benzamide as the mono- and di-hydrochlorides, the phosphate, the mono- and di-hydrobromides, the nitrate, the acid-fumarate (trans), the acid-malonate, the acid-maleate (cis), the acid-d-tartrate, the acid-succinate, the acid-malate, plus the acid and neutral sulfates. In all cases excepting the sulfate salts, we had difficulty in producing a crystalline product. In most cases we had no success in producing a crystalline product; most products were sticky, gummy substances and difficult to handle. It appears that most of the salts other than the sulfate salts are very hygroscopic and for this reason just about impossible to obtain in the crystalline state.

In the case of the hydrochloride salts, it was possible to obtain crystalline products when the salts were prepared under conditions of very low humidity with completely anhydrous solvents followed by drying in an efficient desiccator. When, however, these salts were handled under normal conditions, they became sticky, lumpy products due to their hygroscopic nature. This is true of both the mono- and di-hydrochlorides.

A pharmaceutical product, to satisfy the rigid requirements of the pharmacist and the medical profession, must have pharmaceutical "elegance." This means the product must have pleasing physical and esthetic properties. Thus, liquid preparations must be clear solutions which are either colorless or are of a pleasing, standard color. Tablets and capsules must be white or of a standard color and must retain an attractive physical appearance. If the "drug" or pharmaceutical is hygroscopic, these dry products will rapidly lose their attractive appearance. The tablets and capsules become sticky and in the case of tablets, soon begin to crumble and disintegrate. The contents of capsules begin to shrink and add to the unattractive appearance of the product. To prevent these difficulties, it becomes necessary to resort to expensive and often not too satisfactory precautions. For example, the manufacturing activities must be conducted in specially dehumidified rooms, the bottles containing the dry products must contain a desiccant to absorb moisture which is sure to diffuse into the containers. If it is necessary to store the product for long periods of time, or if the container closure is defective, the desiccant will become dissipated, and the product may become unusable.

It is in view of the above that the present invention becomes important. It was to our surprise that the salts of p-amino-N-(2-diethylaminoethyl)-benzamide were found to be so hygroscopic and more to our surprise that the neutral and acid sulfate salts were found to be almost non-hygroscopic. We have tested these two sulfate salts under conditions of 87% humidity and found them to show little or no indications of being of a hygroscopic nature. It was only after prolonged exposure at these conditions that the acid sulfate salt became somewhat sticky, however, the neutral sulfate remained unchanged. In comparison, the other salts tested showed themselves to be so hygroscopic that they were very difficult or impossible to prepare. When they were prepared, they required drastically curtailed humidity conditions to prevent their becoming unworkable.

For its superior properties, the neutral sulfate salt is preferred over the acid sulfate salt.

We have further found the two sulfate salts to be so non-hygroscopic that they may be dried after preparation by conventional air-drying.

The two sulfate salts of the present invention are very easy to prepare and purify according to the process of our invention. Requisite amounts of p-amino-N-(2-diethylaminoethyl)-benzamide and sulfuric acid (2 moles of p-amino-N-(2-diethylaminoethyl)-benzamide per mole of sulfuric acid for the neutral sulfate and mole for mole for the acid salt) are dissolved in a solvent such as ethyl alcohol after stirring. After standing a short time, the crystalline product precipitates.

It is an object of the present invention to provide pharmaceutically "elegant" salts of p-amino-N-(2-diethylaminoethyl) - benzamide which are not hygroscopic and which may be easily crystallized.

It is a further object to provide salts of p-amino-N-(2-diethylaminoethyl) - benzamide which are easily purified.

It is a further object to provide a preferred process for the preparation of the salts of the invention.

It is also an object of the present invention to provide pharmaceutical salts of a novel chemical compound which has unique therapeutic properties. At present its greatest indication is in correcting cardiac arrhythmia. This compound is the base of the present invention, namely, p-amino-N-(2-diethylaminoethyl)-benzamide. This compound may be prepared by reducing p-nitro-N-(2-diethylaminoethyl)-benzamide with hydrogen and a palladium catalyst. This base has a melting point of 76.5–77.5° C. The boiling point is 230° C. at 1 mm. pressure.

In order more clearly to disclose the nature of the present invention, several specific examples illustrating the preparation of typical compounds will hereinafter be described. It should be understood, however, that this is done solely by way of example and is intended neither to delineate the scope of the invention nor limit the ambit of the appended claims.

EXAMPLE I

*Acid-sulfate salt of p-amino-N-(2-diethylaminoethyl)-benzamide*

To a solution of about 5 cc. of chloroform containing 0.235 gram (0.001 mole) of p-amino-N-(2-diethylaminoethyl)-benzamide there is added slowly 1 cc. of an ethanol solution containing 0.001 mole of hydrogen sulfate. After stirring for a short period of time and permitting the mixture to stand for several hours, a crystalline product precipitates, which upon filtration and air-drying has a melting point of 165° C. The process produces the acid sulfate salt in almost quantitative yield. A 1% aqueous solution of this salt has a pH of 2.47.

EXAMPLE II

*Neutral-sulfate salt of p-amino-N-(2-diethylaminoethyl)-benzamide*

To a solution containing 47 grams (0.2 mole) of p-amino-N-(2-diethylaminoethyl)-benzamide dissolved in 100 cc. of ethyl alcohol containing 5% methanol as a denaturant, there is added an ethyl alcohol solution (10%) of hydrogen sulfate in sufficient quantity to contain 9.8 grams (0.1 mole) of hydrogen sulfate. This sulfuric acid is added slowly with stirring. The crystals which precipitate are filtered off and washed with ethanol. The product is air-dried. The product is produced in almost quantitative yield. The compound has a melting point of 232–4° C. A 1% aqueous solution has a pH of 5.9.

As has been described above, the sulfate salts of p-amino–N-(2-diethylaminoethyl)-benzamide are very suitable for use in capsules, tables and solutions. The following example illustrates a tablet composition of the neutral-sulfate salt of p-amino-N-(2-diethylaminoethyl)-benzamide.

EXAMPLE III

Formula for 100 tablets:

|  | gm. |
|---|---|
| Neutral sulfate salt of p-amino-N-(2-diethylaminoethyl)-benzamide | 25.0 |
| Lactose | 12.5 |
| Corn starch | 2.0 |
| Talc | 1.5 |
| Magnesium stearate | 0.5 |
| Corn starch, dried | 6.0 |

The tablets are prepared by mixing the neutral sulfate salt of p-amino-N-(2-diethylaminoethyl)-benzamide with lactose, screening and moistening slightly. This mixture is granulated with a corn starch paste made by dissolving 2 gms. of corn starch in 20 cc. of water with heat. After completion of the granulation, the preparation is dried thoroughly at 100° F. To this granulation is added the talc. magnesium stearate and the 6 gms. of dried corn starch. After thoroughly mixing, the tablets are compressed in a conventional tablet machine.

Other suitable pharmaceutical preparations may be prepared by dissolving 10 grams of either of the sulfate salts in 100 c. c. of sterile water or by incorporating one of the salts into a conventional capsule mixture.

The sulfate salts of the present application may also be prepared directly by reducing p-nitro-N-(2-diethylaminoethyl)-benzamide in an alcoholic or aqueous solution of sulfuric acid.

Others may readily adapt the invention for use under various conditions of service, by employing one or more of the novel features disclosed, or equivalents thereof. As at present advised with respect to the apparent scope of our invention, we desire to claim the following subject matter.

We claim:
1. A sulfuric acid, acid-addition salt of p-amino-N-(2-diethylaminoethyl)-benzamide.
2. The neutral-sulfate sale of p-amino-N-(2-diethylaminoethyl)-benzamide.
3. The acid-sulfate salt of p-amino-N-(2-diethylaminoethyl)-benzamide.

MARJORIE B. MOORE.
CHARLES A. STAINBROOK.

REFERENCES CITED

The following references are of record in the file of this patent:

UNITED STATES PATENTS

| Number | Name | Date |
|---|---|---|
| 2,490,780 | Clinton | Dec. 13, 1949 |

FOREIGN PATENTS

| Number | Country | Date |
|---|---|---|
| 500,476 | Great Britain | Feb. 6, 1939 |

OTHER REFERENCES

Baltzly et al.: "J. Am. Chem. Soc.," vol. 64 (1942), p. 2231.